Oct. 13, 1931.   P. S. HOPKINS   1,826,786
METHOD AND APPARATUS FOR REPRODUCING SOUND IN CONNECTION WITH PICTURES
Filed Aug. 10, 1927

INVENTOR
Philip S. Hopkins

Patented Oct. 13, 1931

1,826,786

UNITED STATES PATENT OFFICE

PHILIP S. HOPKINS, OF BINGHAMTON, NEW YORK, ASSIGNOR, BY MESNE ASSIGNMENTS, TO AGFA ANSCO CORPORATION, OF BINGHAMTON, NEW YORK, A CORPORATION OF NEW YORK

METHOD AND APPARATUS FOR REPRODUCING SOUND IN CONNECTION WITH PICTURES

Application filed August 10, 1927. Serial No. 212,024.

In the art of photography, it has become general practice to make a series of photographs on a strip of film, which after development may be projected one at a time to a screen for viewing. This has in a measure superseded the old type of lantern slide projecting apparatus, due to the fact that a great many more pictures can be made on a continuous strip of film with less resultant bulk and the projecting apparatus for projecting such pictures to a screen is much smaller and less bulky than the apparatus required for projecting lantern slides.

It has also become common practice in the art of photography to record sound on film from which it may be reproduced and amplified to produce what is known as "talking film". Motion pictures and this sound film have also been combined in projection and reproduction, to make "talking movies".

The purpose of my invention is to combine the use of a sound film, with a strip of film of "still" pictures as above described, whereby a lecture or description of the pictures may be recorded on a film separately from the picture film and reproduced in connection with the projection of such pictures and simultaneously therewith, to provide for instance, an illustrated lecture without the necessity of the lecturer.

Another object of my invention is to provide means whereby upon the reproduction of the sound film, the shifting of the picture film in the projector may be accomplished either automatically or by manual operation upon a signal or indication given by the sound record.

Other objects and advantages in details of construction and operation will be apparent as the description proceeds, reference now being had to the figures of the drawings, wherein like reference numerals indicate like parts.

In the drawings:—

Figure 1:
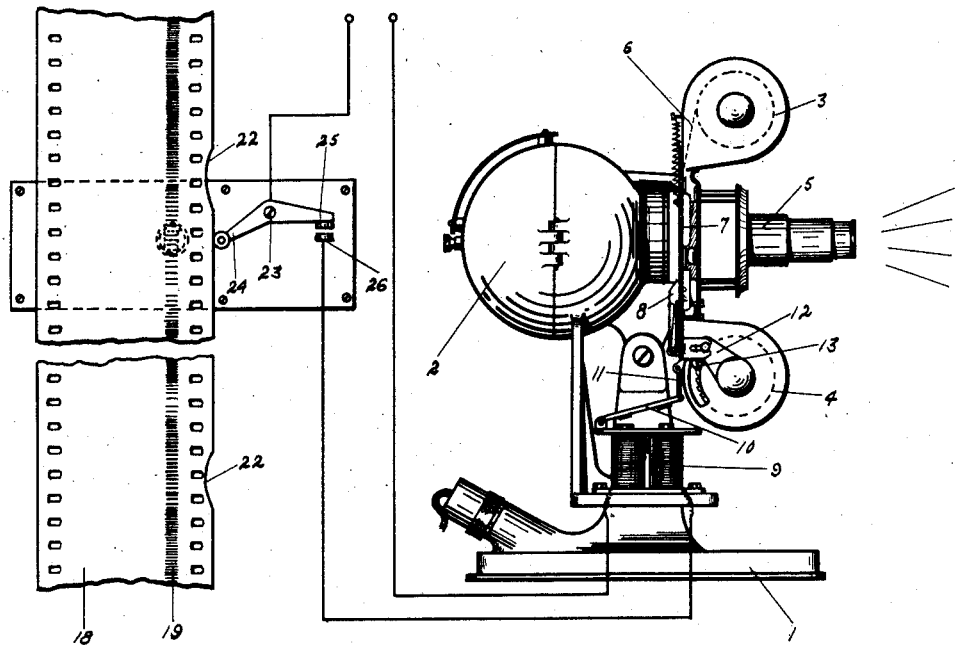
Figure 1 is a side view of a projector for the picture film, there being shown in detail, and partly diagrammatically the control for the picture film by the sound film.

The reference numeral 1 indicates a base or supporting member for a projector comprising the lamp housing 2, film magazines 3 and 4, and lens mount 5. The strip of picture film in the projector is adapted to be unwound from the upper magazine 3 and pulled downwardly between the lamp in the lamp housing 2, and the lens mount 5, whereby the images on such film will be projected to a suitable screen, not shown. Such picture film is indicated in dotted lines at 6.

Suitable means are provided for shifting the film 6 downwardly, comprising a slide 7, carrying a pivoted claw 8, the teeth of which are adapted to engage within the perforations along the edge of the film, and when such claw and slide 7 are moved downwardly, to move the film a predetermined distance, equal to one of the photographic image frames on the film. On the return or upward stroke of the claw 8, the teeth thereof ride out of the perforations of the film until the return is completed, whereupon they engage again with the perforations, ready for the next downward movement of the film. The structure thus described has not been shown in any great detail because it is well known in the art and forms no part of this invention.

Instead of the usual manually operated means for shifting the claw, 1 may provide the projector with electrical means for so shifting such pawl. This electrical means comprises an electromagnet 9, provided with a pivoted armature 10, adapted to be attracted to the magnet coils. The free end of this armature 10 is secured as by the link 11 to the lower end of the slide 7, whereby upon energizing the magnet 9, the downward movement of the armature 10 will move the pawl 8 downwardly to shift the film a distance of one frame. Of course, any suitable means such as the crank 12 and the pawl and ratchet device 13, operated by the downward movement of the slide 7, may be provided for rotating the take up reel 4 in the lower film magazine, whereby to wind the film 6 thereon as it moves downwardly past the projection station.

Figure 2:
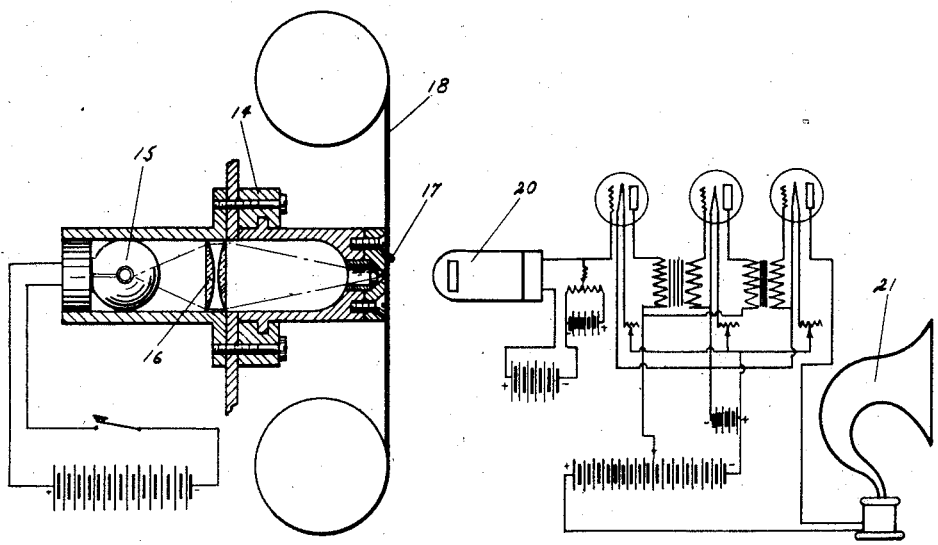
Figure 2 is a detail view of a sound reproducing apparatus partly in diagram for convenience.

With reference now to Figure 2, I have illustrated a conventional form of sound reproducing means, comprising a support 14 within which is mounted a reproducing lamp 15 of constant intensity, the rays of which pass through lenses 16 and through an optical slit member, in this instance a prism 17, past which and in engagement with which the film 18 bearing the sound record 19 is moved continuously. The modulated light rays passing through the sound record on the film are caught by a photo-electric cell 20, where they are converted into electric impulses or amplified in any well known or approved manner and passed to the loud speaker 21.

As shown clearly in Figure 1, the sound film 18 is provided along one edge at predetermined points with notches 22. Pivoted at 23 is an arm, one end 24 of which is provided with a roller, engageable with the edge of the film 18 and adapted to ride on such edge and to engage within the notches 22 as they pass the same. The opposite end 25 of this arm is provided with a contact member adapted to engage with a stationary contact 26 when the end 24 of the arms engages with the notches 22. The engagement of these contact members 25 and 26 serves to close a suitable electric circuit to energize the electric magnet 9. Obviously therefore each time one of the notches 22 passes the end 24 of the contact arm, the magnet 9 will be energized and the film 6 in the picture projector will be shifted a distance of one frame.

The notches 22 are so placed along the edge of the sound film 18 in relation to the recorded sound thereof, as to bring about said shifting of the picture film at the proper and desired points in relation to the recorded sound.

It may not be desirable however to have the reproduction of the sound record operate the picture shifting device and in such event an operator may do this by hand and the sound record utilized to give him indication or signal at the proper time to shift the picture. Such indication may take many forms as for instance a "click" recorded and reproduced in the sound record itself at proper intervals, or a bell or lamp operated by the switch arm 24. The operator, observing such indication then moves the film shifter manually to change the picture.

The operation of my invention is as follows:—Assuming that a series of pictures has been made on a strip of film and that this strip of pictures is to be used for educational purposes, that is, described by means of a lecture accompanying such pictures, for the edification of those who see them, a photographic sound record is now recorded in the well known manner in connection with such pictures, that is the description of the pictures, or a lecture concerning them, recorded on a strip of film 18 and at each point during such lecture where it is desirable to have the picture film shifted to bring the next image into position for projection, a notch 22 is made on the sound film.

Obviously therefore, when the sound film is run through a reproducing apparatus, such as that shown in Figure 2, and the picture film 6 is ready for projection to the picture projector, the sound record will be reproduced, and at the proper intervals, the pictures will be shifted and there is thus provided an illustrated lecture without the necessity of the lecturer, and the only operator required being one for changing the film in the reproducing apparatus and projector when necessary. The many advantages of such a device will be apparent to those skilled in the art as from one strip of pictures and one recording of the lecture pertaining to such pictures, as many prints as desired can be made and sent to all parts of the country simultaneously, to libraries, schools, lecture halls, clubs, etc., equipped with a sound reproducing apparatus and a picture projector as herein described.

Of course, many changes may be made in details of construction and operation as desired, without departing from the spirit and scope of my invention. I do not limit myself therefore to the exact form and structure shown, other than by the appended claims.

I claim:—

1. In combination, a photographic film having a sound record thereon, means for reproducing said record, a picture projector and a series of "still" pictures for projection, means on said projector for shifting said pictures and means on said film operable at predetermined points in relation to the reproduction of said sound record thereon to shift said pictures for projection appropriate to said sound record.

2. In combination, a photographic film bearing a sound record, means for reproducing said record, a picture projector and a strip of film bearing a series of "still" pictures adapted for projection in said projector, means on said projector for shifting said picture film, and means on said record film for automatically causing the operation of said shifting means at predetermined times during the reproduction of said sound record.

3. In combination, a photographic film bearing a sound record, means for reproducing said sound record, notches on the edge of said record film at predetermined intervals, a picture projector and a strip of film bearing a series of "still" pictures adapted for projection in said projector, means on said projector for shifting said picture film, and means operated by said notches for controlling the operation of said shifting means.

4. In combination, a photographic film bearing a sound record, means for reproducing said sound record, notches on the edge of said record film at predetermined intervals, a picture projector and a strip of film bearing a series of "still" pictures adapted for projection in said projector, means on said projector for shifting said picture film, and means operated by said notches for controlling the operation of said shifting means, said shifting means including an electromagnet and said controlling means comprising an electric switch in the circuit of said magnet.

PHILIP S. HOPKINS.